United States Patent
Kranz et al.

(10) Patent No.: US 8,612,099 B2
(45) Date of Patent: Dec. 17, 2013

(54) OCCUPANT RESTRAINT SYSTEM

(75) Inventors: Christopher Joe Kranz, Troy, MI (US); Paul Michael Smith, Davison, MI (US); Nicklaus John Pelliccia, Denver, CO (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/464,712

(22) Filed: May 4, 2012

(65) Prior Publication Data

US 2012/0283916 A1 Nov. 8, 2012

Related U.S. Application Data

(60) Provisional application No. 61/483,361, filed on May 6, 2011.

(51) Int. Cl.
- *B60R 22/00* (2006.01)
- *A47L 3/04* (2006.01)
- *A62B 1/08* (2006.01)

(52) U.S. Cl.
USPC .................. 701/45; 280/801; 182/3; 182/231

(58) Field of Classification Search
USPC ........................... 701/45; 280/801; 182/3, 231
See application file for complete search history.

(56) References Cited

U.S. PATENT DOCUMENTS

| | | | |
|---|---|---|---|
| 4,145,074 A * | 3/1979 | Hendricks ..................... | 280/808 |
| 4,303,041 A * | 12/1981 | Thompson et al. ............. | 482/66 |
| 6,604,597 B2 | 8/2003 | Fujii et al. | |
| 6,615,138 B1 * | 9/2003 | Schiffmann et al. .......... | 701/301 |
| 6,651,594 B1 * | 11/2003 | Bagwell ....................... | 119/770 |
| 6,726,249 B2 | 4/2004 | Yano et al. | |
| 6,775,605 B2 * | 8/2004 | Rao et al. ........................ | 701/45 |
| 6,819,991 B2 * | 11/2004 | Rao et al. ........................ | 701/45 |
| 6,827,308 B2 | 12/2004 | Fujii et al. | |
| 7,016,782 B2 * | 3/2006 | Schiffmann .................. | 701/301 |
| 7,100,991 B2 | 9/2006 | Schroth | |
| 7,890,263 B2 * | 2/2011 | Prakah-Asante et al. ..... | 701/300 |
| 8,251,304 B2 * | 8/2012 | Boyer et al. ................... | 242/383 |
| 2009/0159365 A1 * | 6/2009 | O'Brien ........................... | 182/3 |
| 2010/0101060 A1 | 4/2010 | Walega et al. | |

OTHER PUBLICATIONS http://olive-drab.com/od_mvg_hmmwv_safety_improvements.php a PDF the website from 2010 is provided.*

* cited by examiner

*Primary Examiner* — Thomas Black
*Assistant Examiner* — Tyler Paige
(74) *Attorney, Agent, or Firm* — Foley & Lardner LLP

(57) ABSTRACT

An occupant restraint system including a harness coupled to the occupant by surrounding a portion of the occupant, a winding mechanism fixed to the vehicle and configured to operate in a first mode and a second mode, and a flexible linking member having a first end coupled to the harness and a second end coupled to the winding mechanism. The linking member is configured to selectively wind and unwind from the winding mechanism. When the winding mechanism is in the first mode of operation, the linking member may be unwound from the winding mechanism to allow the occupant to move freely about the vehicle. When the winding mechanism is in the second mode of operation, the winding mechanism winds the linking member to pull the harness toward the winding mechanism.

20 Claims, 6 Drawing Sheets

OCCUPANT RESTRAINT SYSTEM

CROSS-REFERENCE TO RELATED PATENT APPLICATIONS

The present application claims the benefit of and priority to U.S. Provisional Patent Application No. 61/483,361, filed on May 6, 2011. U.S. Provisional Patent Application No. 61/483,361 is incorporated by reference herein in its entirety.

BACKGROUND

The present application relates generally to the field of occupant restraint systems for use in moving vehicles. More specifically, this application relates to an automated occupant restraint system configured to displace (e.g., lower) an occupant provided in the restraint system in vehicle to reduce the likelihood of injury to the occupant during specified events, such as a rollover event.

Restraint systems have been provided in vehicles, such as military vehicles, to secure occupants, such as turret gunners, in a relatively fixed position. FIG. 2 illustrates a conventional restraint system 30, where an occupant 27 is provided within the opening 21 of the turret assembly 20 and restrained by the occupant restraint system 30. The restraint system 30 includes a seat support member 31 for supporting the occupant, a webbing 32 fixedly coupled to the vehicle and seat support member 31, an anchor member 33 coupled to the vehicle to reduce the sway (i.e., lateral displacement) of the seat support member 31, and a harness member 34 attached to the seat support member 31. The anchor member 33 is configured as a strap having a first end connected to the bottom of the seat support member 31 and a second end connected to the base 13 of the vehicle 10. The occupant 27 is suspended a vertical distance above a base 13 of the vehicle 10 by the restraint system 30. The webbing 32 and the anchor member 33 are taunt to maintain a substantially fixed position of the seat support member 31 relative to the base 13. Thus, the restraint system 30 may prevent ejection of the occupant 27 through the opening 21 of the vehicle 10, but does not mitigate the possibility of injury of the occupant 27, such as to the externally exposed portions of the occupant, by being exposed outside the vehicle 10.

It would be advantageous to provide an occupant restraint system that is configured to restrain and move the occupant, such as downwardly from an exposed position into the vehicle to a less (or not) exposed position in order to reduce the amount of the occupant exposed from the vehicle upon an occurrence of an event, such as a rollover event. Such a system may advantageously reduce the likelihood of injury to the occupant by moving the occupant to a position having a greater level or amount of protection.

SUMMARY

One embodiment relates to an occupant restraint system for securing an occupant of a vehicle. The occupant restraint system includes a harness coupled to the occupant by surrounding a portion of the occupant, a winding mechanism fixed to the vehicle and configured to operate in a first mode and a second mode, and a flexible linking member having a first end coupled to the harness and a second end coupled to the winding mechanism. The linking member is configured to selectively wind and unwind from the winding mechanism. When the winding mechanism is in the first mode of operation, the linking member may be unwound from the winding mechanism to allow the occupant to move freely about the vehicle. When the winding mechanism is in the second mode of operation, the winding mechanism winds the linking member to pull the harness toward the winding mechanism.

Another embodiment relates to an occupant restraint system for securing an occupant of a vehicle. The occupant restraint system includes a seat support member configured to provide seating to the occupant, a webbing configured to connect the seat support member to the vehicle, a harness configured to secure the occupant and to couple to one of the webbing and seat support member, a winding mechanism fixed to the vehicle and configured to operate in a first mode and a second mode, and a flexible linking member having a first end coupled to the harness and a second end coupled to the winding mechanism. The linking member is configured to selectively wind and unwind from the winding mechanism. When the winding mechanism is in the first mode of operation, the linking member may be unwound from the winding mechanism to allow the occupant to move freely in the vehicle. When the winding mechanism is in the second mode of operation, the winding mechanism winds the linking member to pull the harness and occupant toward the winding mechanism.

Yet another embodiment relates to a vehicle including a sensor configured to detect a parameter of the vehicle, a control module configured to communicate with the sensor, and an occupant restraint assembly for securing an occupant of the vehicle. The occupant restraint assembly includes a harness configured to be coupled to the occupant, a winding mechanism fixed to the vehicle and configured to operate in a first mode and a second mode, and a flexible linking member having a first end coupled to the harness and a second end coupled to the winding mechanism. The linking member is configured to selectively wind and unwind from the winding mechanism. When the winding mechanism is in the first mode of operation, the linking member may be unwound from the winding mechanism to allow the occupant to move freely in the vehicle. When the winding mechanism is in the second mode of operation, the winding mechanism winds the linking member to pull the harness and occupant toward the winding mechanism. The control module controls the operation of the winding mechanism based on a data received from the sensor regarding the parameter.

DETAILED DESCRIPTION

Figure 1:
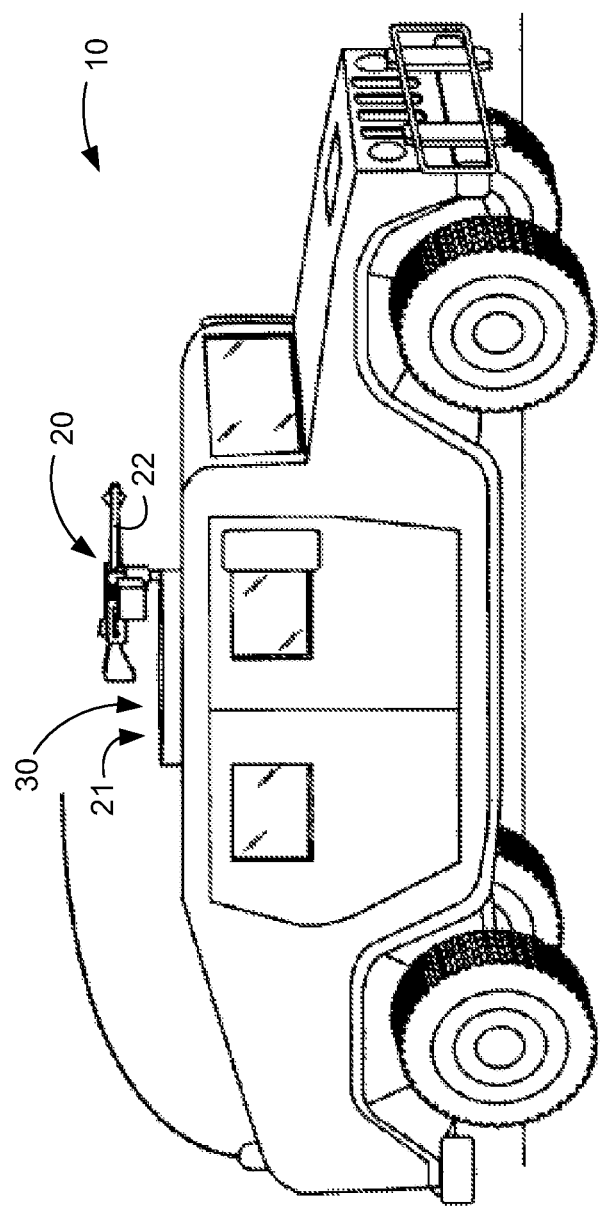
FIG. 1 is a perspective view of an exemplary embodiment of a vehicle having an occupant restraint system to restrain the occupant positioned in the turret assembly.
Figure 2:
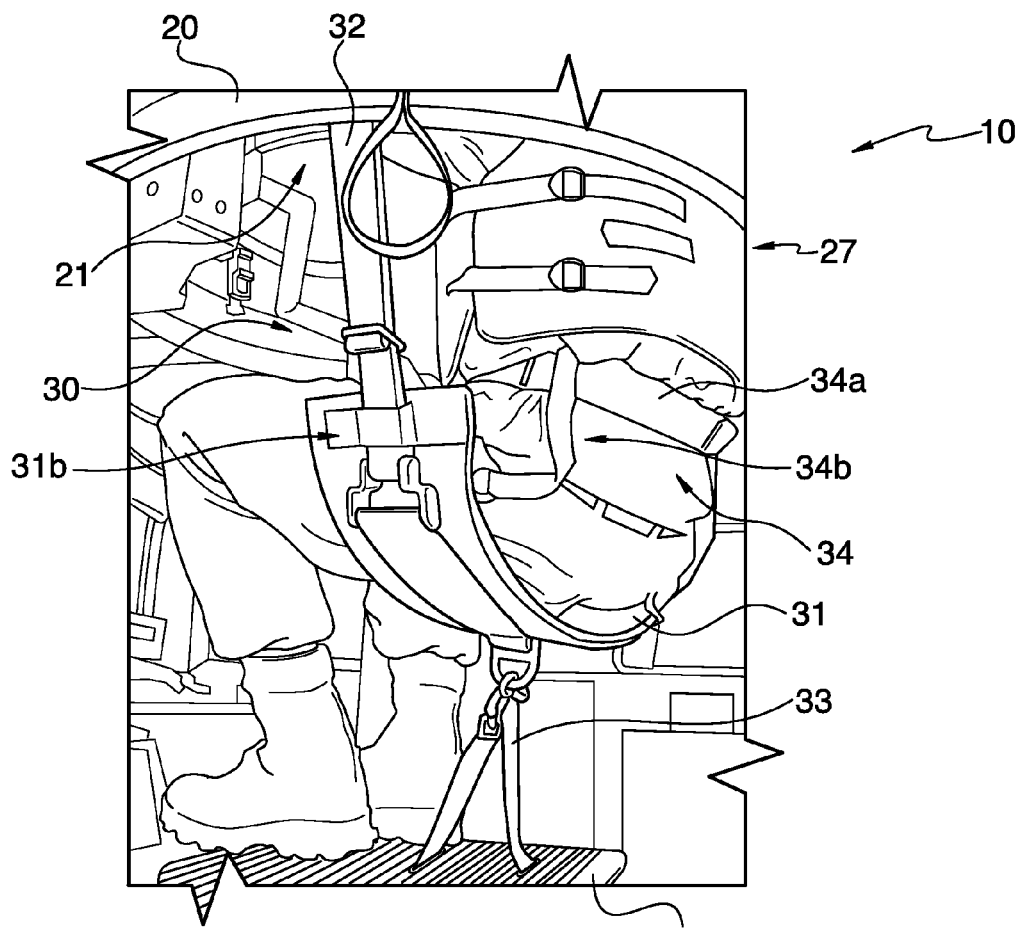
FIG. 2 is a perspective view of an occupant provided in a turret assembly of a vehicle and being restrained by a conventional occupant restraint system.

It is currently known for vehicles (e.g., military vehicles) having a turret assembly to be configured with an occupant restraint device to restrain the occupant positioned within the turret assembly. However, current restraint devices are configured to remain in a substantially fixed position (i.e., having a fixed vertical height relative to the turret assembly and/or to the base of the vehicle) to maintain the position of the occupant provided in the turret opening relative to the turret. Thus, the current restraint devices are limited in the restraint (and hence protection) offered to the vehicle occupants, and are configured merely to prevent occupant ejection from the vehicle and/or excessive sway of the occupant from lateral forces. Therefore, the current restraint devices are ineffective at preventing injuries to the occupant of the turret assembly from some critical situations, such as vehicle rollover events or from other traumatic events, where it is desirable to eliminate or reduce the amount of occupant exposure outside the vehicle through the turret opening and beyond the turret assembly, such as by changing the height position of the restraint device and occupant relative to the turret assembly.

The occupant restraint systems as disclosed herein are configured to eliminate or reduce the amount of occupant exposure outside the vehicle, such as the amount exposed through the turret system during such critical situations (in addition to preventing occupant ejection and excessive sway). The occupant restraint systems as disclosed herein are configured to change the position (e.g., height) of the occupant restraint system, as well as the occupant restrained by the system, relative to the turret assembly (e.g., turret opening). Thus, the occupant restraint systems as disclosed herein are configured to improve occupant safety by reducing the likelihood of occupant injury by reducing the amount of exposure of the occupant outside the vehicle during critical events.

The occupant restraint systems disclosed herein may further be automated to control the operation of the occupant restraint systems. The vehicle may include a restraint control module (RCM) configured to communicate with the occupant restraint system, whereby the RCM may also communicate with various sensors (e.g., proximity sensors, acceleration sensors, occupant detection sensors) on the vehicle or external to the vehicle to predict critical vehicle events and accordingly trigger actuation of the occupant restraint system. The RCM may receive data from the various sensors (e.g., vehicle sensors) and may determine based on evaluation of the data that the amount of exposure of the occupant should be reduced or eliminated, and then accordingly actuate the occupant restraint system to reduce or eliminate occupant exposure. The RCM may also communicate external to the vehicle (e.g., satellites, command vehicles, etc.), which may provide the RCM with additional information to evaluate in predicting a critical vehicle event that warrants activation of the occupant restraint system.

As shown in FIG. 1, an exemplary embodiment of a vehicle 10 may include a turret assembly 20 and an occupant restraint system 30 configured to restrain the occupant (not shown) provided in the turret assembly 20. The turret assembly 20 includes an opening 21 configured to allow access into and out (i.e., ingress and egress) of the vehicle 10 by an occupant of the vehicle. The turret assembly may include a cover (not shown) to the opening to allow selective access to the vehicle. The turret assembly 20 may further include a firearm 22 or other instrument, the operation of which may necessitate the occupant of the turret assembly to be at least partially exposed from the vehicle, such as beyond the turret assembly of the vehicle.

Although the vehicle 10 illustrated in FIG. 1 is a high mobility multipurpose wheeled vehicle (HMMWV), it should be noted that any military or civilian vehicle that may be configured to have an occupant provided within a turret (or any similar) assembly may be configured to include an occupant restraint system as disclosed herein. The embodiments disclosed in this application are not meant as limitations.

Figure 3:
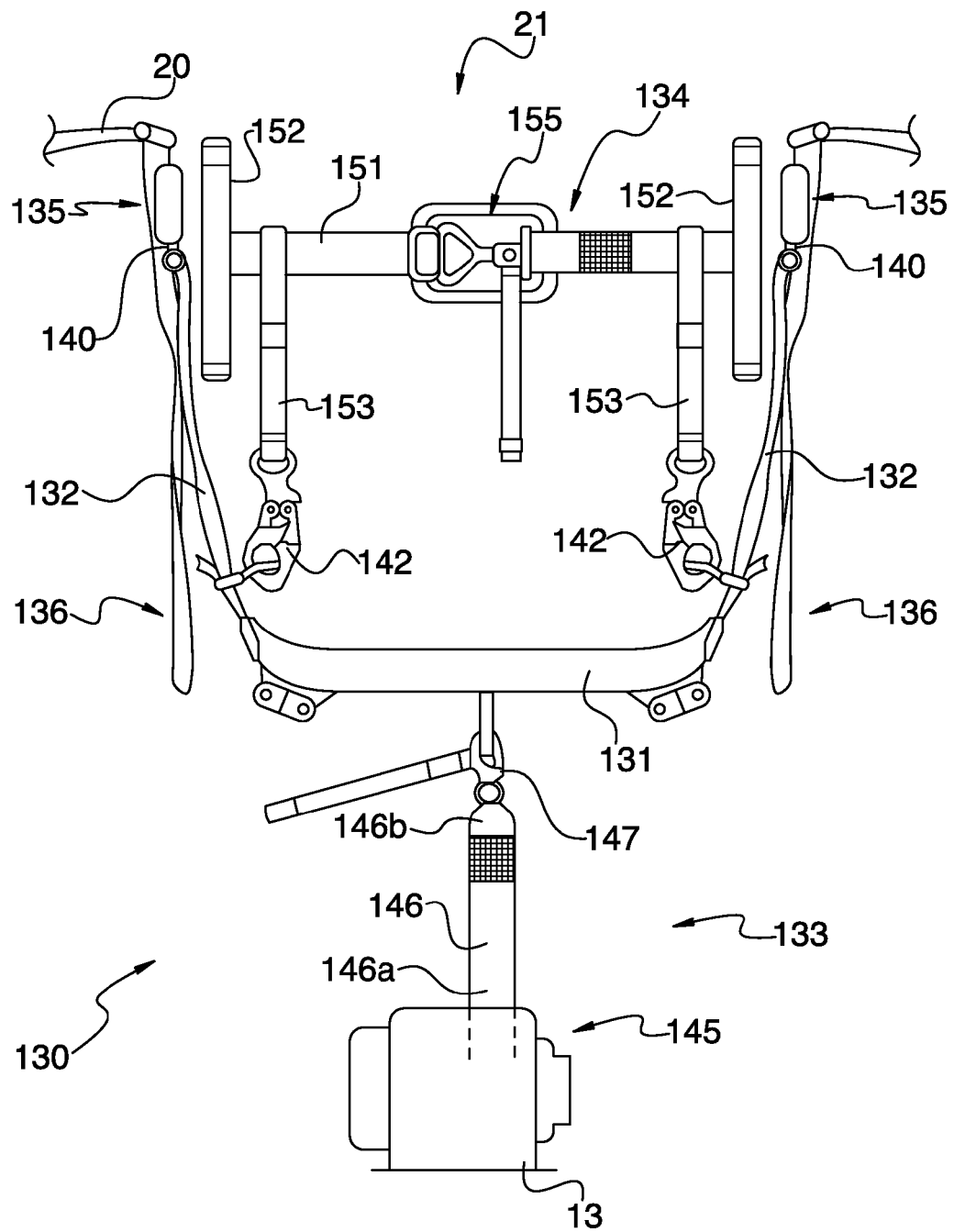
FIG. 3 is a front view of an exemplary embodiment of an occupant restraint system for use in a vehicle, such as the vehicle of FIG. 1.

FIG. 3 illustrates an exemplary embodiment of an occupant restraint system 130 configured to support and restrain an occupant, such as the occupant 27, and to move the occupant, such as to withdraw the occupant into the vehicle from a first exposed position to a second less (or not) exposed position in order to reduce the likelihood of injury to the occupant during an event, such as a rollover event. The occupant restraint system 130 includes a seat member 131, a pair of webbings 132 for suspending the seat member 131, a displacing assembly 133, an occupant harness assembly 134, a pair of release mechanisms 135, a pair of engaging members 140 each configured to selectively engage one release mechanism, and a pair of travel stop members 136. It should be noted that the occupant restraint system may be configured with one or a plurality of release mechanisms, travel stop members, webbings, and the embodiments disclosed herein are not meant as limitations.

The seat member 131 is configured to provide seating to an occupant of the vehicle and may have any suitable configuration (e.g., shape, size, material) made using any method. According to an exemplary embodiment, the seat member 131 is made of a fabric having a substantially rectangular shape that is configured to provide seating to the occupant 27. The seat member 131 may be made from any fabric (e.g., natural, synthetic, composite, etc.) that is strong enough to withstand the forces of supporting the occupant and can withstand the forces acting to induce the displacement of the seat member 131. The seat member 131 may be configured to be adjustable, such as to accommodate different sized occupants.

Each webbing 132 may be configured to support the seat member and may have any suitable configuration (e.g., shape, size, material) made using any method. Each webbing 132 may be made from any suitable fabric (e.g., natural, synthetic, composite, etc.) that is strong enough to withstand the forces of supporting the occupant. According to an exemplary embodiment, a pair of webbings 132 are made from woven nylon fabric and configured as straps, with each strap having a first end connected to the seat member 131 and a second end connected to the engaging member 140 that is configured to selectively couple to the release mechanism 135. A first webbing 132 is provided on the right side of the seat member 131 and a second webbing 132 is provided on the opposing left side of the seat member 131 forming a sling apparatus that provides for suspended seating for the occupant 27. Each webbing 132 may be configured to allow for the adjustment of the length between the engaging member 140 and the location of connection to the seat member 131, thereby allowing for height adjustment of the seat member 131 in vehicle relative to the turret assembly 20 and/or the base 13.

The release mechanism 135 may be configured using any suitable device or method configured to provide selective engagement (or coupling) to the engaging member 140. An exemplary embodiment of a release mechanism 135 is disclosed in U.S. Published Patent Application No. 2010/0101060 to Walega et al. published Apr. 29, 2010, which is incorporated by reference herein in its entirety. The release mechanism 135 may be configured as a buckle or buckle mechanism for a seat belt assembly.

According to an exemplary embodiment, the release mechanism 135 includes an opening configured to receive and retain the engaging member 140 when the engaging member 140 is inserted a predetermined distance into the opening. The release mechanism 135 may be configured to selectively release the engaging member 140. The release mechanism 135 may include a manual release that may be activated by an occupant of the vehicle, such as by depressing a button, which triggers release of the engaging member 140 from the release mechanism 135. The release mechanism 135 also may include an automated release, which may be activated remotely by a device (e.g., the RCM of the vehicle), such as, for example, through the use of a cable, a solenoid, or any suitable device. The RCM may receive and analyze data, such as data provided by vehicle or satellite sensors, to determine when an event is occurring that warrants activation of the occupant restraint system and release of the release mechanism 135. The RCM may communicate with the occupant restraint system 130 (e.g., the release mechanism 135) electrically through a directly wired connection (e.g., through a wiring harness) or through a wireless connection.

The automated release of the release mechanism 135 may be configured to be activated by a parameter, such as a force, an acceleration, and/or inertia, where the parameter activates the release of the engaging member 140 from the release mechanism 135. For example, the release mechanism 135 may be a tear stitch (or break-away stitch) that is configured to tear or release when subjected to a predetermined force or tension. As another example, the release mechanism 135 may be a metallic member (e.g., hook) configured with a known strength that engages a feature on the turret that retains the hook until the hook is subjected to a threshold force, which may elastically and/or plastically deform the hook allowing it to become disengaged with the turret. It should be noted that the release mechanism may be configured using any device or method for selectively connecting a first device and a second device, and those devices or methods disclosed herein are not limiting.

The engaging member 140 is configured to selectively engage the release mechanism 135, such as to suspend the seat member 131 through the webbing 132. According to an exemplary embodiment, the engaging member 140 is configured as a tongue member that is well known in the art for use in a seat belt assembly to selectively engage a seat belt buckle or buckle mechanism. The tongue member may be configured to include a plate with an aperture, whereby when the plate of tongue member is inserted into the buckle a predetermined distance, the locking feature of the buckle engages the aperture to retain the tongue member to the buckle until the release of the buckle is activated.

The occupant harness assembly 134 is configured to be attached to the occupant to secure the occupant to the occupant restraint system 130, such as to the seat member 131 through the harness assembly 134. The harness assembly 134 may be configured to surround, encircle, encompass, skirt, enclose, cover, wrap around, envelop, enfold, and/or overlay the occupant or a portion of the occupant to couple the harness assembly 134 directly to the occupant. The harness assembly 134 may include a plurality of straps that may be made from a high strength woven fabric material to provide flexible restraint that is comfortable to the secured occupant. For example, the harness assembly 134 may include one or more straps configured to circumscribe the profile of the torso of the occupant to restrain the occupant by the torso or thorax. As another example, the harness assembly 134 may include one or more flexible straps configured as a belt to circumscribe the waist of the occupant and may include one or more flexible straps to partially circumscribe the shoulders of the occupant to restrain the occupant to the occupant restraint system 130. The harness assembly may also be configured using methods other than a strap. The harness assembly may be configured as a vest that the occupant wears over the torso. The vest harness may include additional protective features, such as being made from Kevlar® or any protective material, that may act as body armor by providing improved ballistic protection to the occupant.

As shown in FIG. 3, the harness assembly 134 includes a first strap 151 configured to circumscribe or wrap around the torso (e.g., chest) of the secured occupant, a pair of opposing second straps 152 configured to wrap around the shoulders of the occupant, and a pair of opposing third straps 153 configured to connect the harness assembly 134 to another component of the occupant restraint system 130. For example, each third strap 153 may extend between and connect to the first strap 151 and the webbing 132. As another example, the third strap may extend between and connect to the second strap 152 and the seat member 131. The straps 151, 152, 153 may be flexible, such as made from a fabric (e.g., woven nylon, polyester, etc.) in order to secure the occupant to the occupant restraint system 130 without impeding the ability of the occupant to use his arms and/or operate vehicle equipment.

The harness assembly 134 may include an adjuster 155 configured to allow for adjustment of the harness assembly 134 by the occupant to accommodate different size occupants. For example, the adjuster 155 may be configured to adjust a length (e.g., perimeter, circumference) defined by the first strap 151 to be shorter or longer, depending on the size of the occupant, to fit the perimeter of the torso of the occupant being secured by the harness assembly 134. The harness assembly 134 may also include adjusters for adjusting the other straps, such as a length of the second strap 152. The adjuster 155 of the harness assembly 134 may have any suitable configuration, such as, for example, including a hook and loop device that allows for lengthening or shortening of the one or more than one strap that circumscribes the torso and/or waist of the occupant. As another example, the adjuster 155 of the harness assembly 134 may be configured similar to a belt having a prong or catch configured to engage one of a plurality of apertures in the strap to provide adjustability. It is noted that the adjuster 155 may be configured differently than the examples disclosed herein, and the examples are not limiting.

The harness assembly 134 may further include a connector 142 for selectively coupling the harness assembly to another component of the occupant restraint system 130, such as the webbing 132 and/or the seat member 131. As shown in FIG. 3, the third straps 153 of the harness assembly 134 may be provided on two opposing sides of the first strap 151. Each third strap 153 may include a first end 153a and a second end 153b, where the first end 153a is coupled to the first strap 151 and the second end 153b is coupled to a connector 142 to provide a releasable connection between the harness assembly 134 and the webbing 132 (and/or seat member 131) of the occupant restraint system 130. In other words, the connector 142 allows the second end 153b of the third strap 153 to be decoupled from and reattached to the webbing 132 as desired by the secured occupant.

The connector 142 may have any suitable configuration. For example, the connector 142 may be a swivel hook configured to selectively connect the harness assembly 134 to the seat member 131 and/or the webbings 132 of the occupant restraint system 130. The connector 142 that is configured to selectively connect to the component of the occupant restraint system 130 allows the occupant to become unrestrained from the occupant restraint system 130 without having to remove the harness assembly 134, such as to allow the occupant to move freely within the vehicle. In addition, the connector 142 allows the occupant to quickly reconnect the harness assembly 134 back to the occupant restraint system 130. The connector 142 may be configured using any suitable device or method to connect the harness assembly 134 to the occupant restraint system 130.

The displacing assembly 133 is configured to displace the seat member 131 and/or the occupant harness assembly 134 (when attached to the occupant restraint system 130) in order to move or displace the restrained occupant. According to an exemplary embodiment, the displacing assembly 133 includes a winding mechanism 145, a webbing 146, and a connector 147. The winding mechanism 145 may be configured to connect to the vehicle, such as to the base 13 of the vehicle 10, to remain fixed relative to the seat member 131 and occupant harness assembly 134. The winding mechanism 145 is configured to wind (or retract) and/or unwind (or extract) the webbing 146. Accordingly, a first end of the webbing 146 is connected to the winding mechanism 145 and a second end of the webbing 146 is connected to another component of the occupant restraint system 130, such as the seat member 131.

The winding mechanism 145 may be configured as any suitable device, such as a motorized seatbelt retractor assembly. An exemplary embodiment of a winding mechanism 145 is disclosed in U.S. Pat. No. 6,726,249 to Yano et al. issued Apr. 27, 2004, which is incorporated by reference herein in its entirety. Other exemplary embodiments of winding mechanisms are disclosed in U.S. Pat. No. 6,604,597 to Fujii et al. issued Aug. 12, 2003 and U.S. Pat. No. 6,827,308 to Fujii et al. issued Dec. 7, 2004, which are incorporated by reference herein in their entirety. It should be noted that the winding mechanism 145 may be configured using other devices and/or methods to wind and/or unwind the connected webbing, and those disclosed and incorporated by reference herein are not meant as limitations.

As shown in FIG. 3, the webbing 146 includes a first end 146a that is connected to the winding mechanism 145 and a second end 146b that is connected to the seat member 131. The second end 146b of the webbing 146 may be connected to the seat member 131 through a connector, such as a selective connector 147 shown configured as a swivel hook. The seat member 131 may include a loop or other feature that extends from the bottom of the seat member 131, whereby the loop is configured to connect to the selective connector 147, which is also coupled to the second end 146b of the webbing 146.

The travel stop member 136 is configured to limit the displacement (or travel) of the occupant restraint system 130, upon release of the engaging member 140 from the release mechanism 135. For example, the travel stop member 136 may be configured to limit the downward travel of the seat member 131. The travel stop member 136 may include one or more than one strap having a first end configured to connect to the turret assembly of the vehicle, and a second end configured to connect to the occupant restraint system 130, such as the webbing 132 or the seat member 131. The travel stop member 136 includes a length adjustment feature to allow for adjustability of the distance the occupant restraint system 130 may travel (or displace) from a first suspended height (or position) above the base 13 of the vehicle to a second shorter suspended height (or position) above the base 13 of the vehicle, upon release of the engaging member 140 from the release mechanism 135. Upon reaching the travel limit, the travel stop member 136 becomes taught (e.g., is put into tension), thereby suspending the occupant restraint system 130 (and hence, the restrained occupant) above the base 13 at the second suspended height.

The occupant restraint system 130 may be configured to operate in two modes. When the occupant restraint system 130 is in the first mode of operation, the occupant is secured to the harness assembly 134, yet the occupant is able to move freely about or around the vehicle since the winding mechanism 145 may allow unwinding of the webbing 146. Thus, the occupant may change position in the vehicle despite being coupled to the harness assembly 145. In other words, the occupant may change vertical positioning and/or horizontal positioning in the vehicle relative to the floor, the turret, or a seat assembly within the vehicle. For example, the occupant may move several feet from a lower position near the floor of the vehicle to an elevated position at least partially within the turret (and exposed therefrom). Upon the occurrence of a triggering event, such as an event determined by the RCM of the vehicle, the occupant restraint system 130 changes to the second mode of operation. In the second mode of operation, the occupant restraint system 130 is configured to activate the winding mechanism 145 to thereby wind the webbing 146 to pull the harness assembly 134 (and secured occupant) toward the winding mechanism 145. For example, if the occupant is exposed through the turret during the event, the occupant restraint system 130 is configured to displace the occupant into the vehicle to eliminate or reduce the amount of the occupant that is exposed from the vehicle through the turret assembly. For a vehicle having a turret area that is substantially closed or sealed off from the rest of the vehicle, the winding mechanism may be provided in the turret area or external to the turret area where only a relatively small opening would be needed for the webbing to pass therethrough. This arrangement may advantageously protect both the occupant of the turret, such as by reducing or eliminating the amount of exposure of the occupant outside the turret, and the other vehicle occupants located in other areas, such as by shielding the other areas from a blast or explosion proximate the turret area.

Further, upon the occurrence of a triggering event, the vehicle and/or the occupant restraint system 130 may activate the release mechanism 135 to release the engaging member 140, thereby allowing the seat member 131 and occupant harness assembly 134 to displace in a downwardly direction toward the base 13 of the vehicle. Subsequent to or simultaneous to the release of the engaging member 140 from the release mechanism 135, the vehicle and/or the occupant restraint system 130 may activate the winding mechanism 145 of the displacing assembly 133, thereby winding or retracting the webbing 146 into the winding mechanism 145 to pull the seat member 131, the occupant harness assembly 134 and the restrained occupant toward the winding mechanism 145 (and the base 13 of the vehicle). The winding mechanism 145 displaces the restrained occupant into the vehicle the predetermined distance set by the travel stop member 136, whereby upon reaching the travel limit, the restrained occupant is suspended at the new height or distance from the base.

Figure 4:
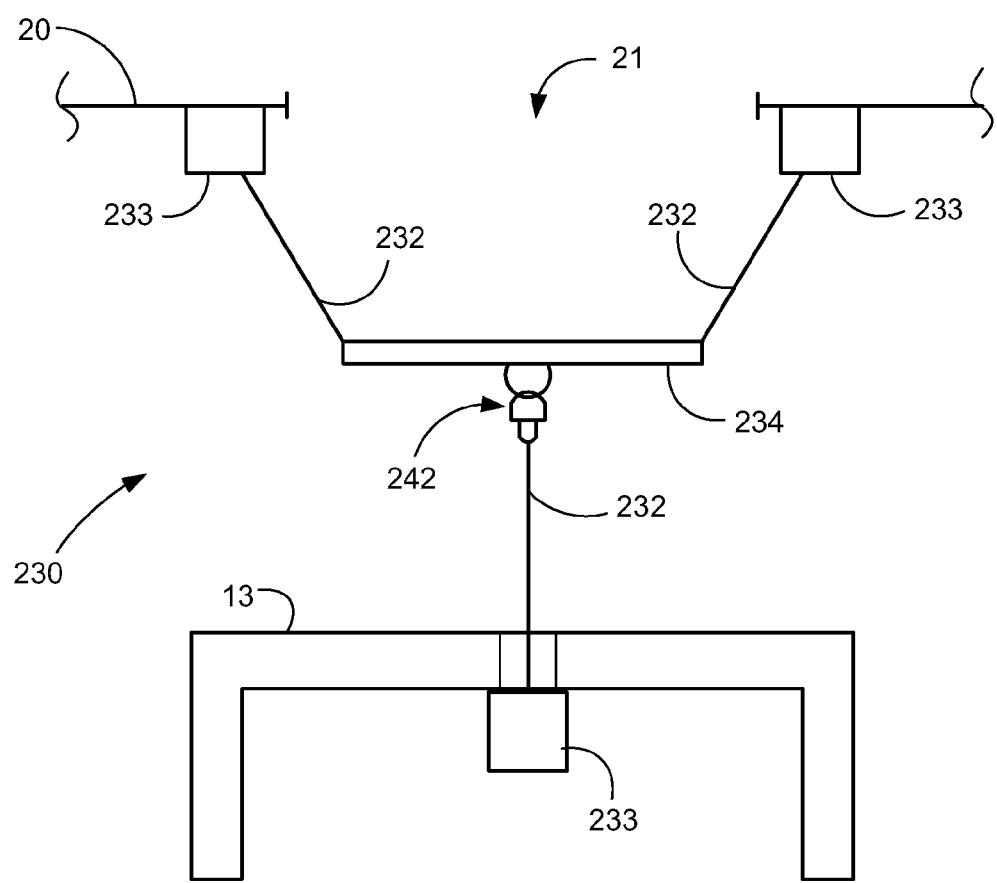
FIG. 4 is a front schematic view of another exemplary embodiment of an occupant restraint system for use in a vehicle.

FIG. 4 illustrates another exemplary embodiment of an occupant restraint system 230 configured for use in a vehicle to restrain an occupant (not shown) of the vehicle provided within the turret assembly 20 or similar feature of the vehicle. The occupant restraint system 230 may be configured to connect to the turret assembly 20 to suspend the occupant restrained to the restraint system within the opening 21 of the turret at a predetermined distance above the base 13 of the vehicle. The occupant restraint system 230 includes an occupant harness assembly 234 for restraining the occupant to the restraint system, a plurality of winding mechanisms 233 to displace the harness assembly 234 and restrained occupant, and a plurality of linking members 232 connecting the harness assembly 234 to the winding mechanisms 233. As shown in FIG. 4, the occupant restraint system 230 may include three winding mechanisms 233 and three linking members 232, whereby each linking member includes a first end connected to one of the three winding mechanisms 233 and a second end connected to the harness assembly 234. Two of the winding mechanisms 233 may be provided above the harness assembly 234, while the third winding mechanism 233 may be provided below the harness assembly 234.

The occupant harness assembly 234 may have any suitable configuration, such as disclosed herein or may be configured using any method to restrain the occupant. The linking member 232 may be configured as a flexible webbing (as disclosed herein), a cable, a chain, a rope, or any device that connects two elements together. The linking member 232 may connect the occupant harness assembly 234 to the winding mechanisms 233 and provide adjustability of the position (e.g., height) of the harness assembly 234 relative to the base 13. The winding mechanism 233 may be configured as a motor, a motorized seat belt, or any suitable device. When activated, such as by the RCM or the occupant restraint system, the winding mechanism 233 may be configured to wind (or extract) and unwind (or retract) the connected linking member 232. For example, the three winding mechanisms 233 may be activated substantially simultaneously, whereby the two winding mechanisms 233 provided above the harness assembly 234 may unwind the connected linking member 232 and whereby the winding mechanism 233 provided below the harness assembly 234 may wind the connected linking member 232, thereby displacing the harness assembly 234 in a direction toward the base 13 (i.e., lowering the harness assembly relative to the base). Also, the occupant restraint system 230 may be activated such that the two winding mechanisms 233 provided above the harness assembly 234 may wind the connected linking member 232 and such that the winding mechanism 233 provided below the harness assembly 234 may unwind the connected linking member 232, thereby displacing the harness assembly 234 in a direction away from the base 13 (i.e., raising the harness assembly relative to the base). The linking members 232 may remain in tension during winding and unwinding to provide a smooth and continuous adjustment of the position of the harness assembly and the restrained occupant.

The occupant restraint system 230 may include one or more than one connector 242 provided between the linking member 232 and the harness assembly 234, such as to provide selective coupling between the harness assembly and the linking member or to allow rotation of the harness assembly 234 relative to the linking member. For example, the occupant restraint system 230 may include a connector 242 provided below the harness assembly 234 and between the lower linking member 232 and the harness assembly 234 to allow for the harness assembly to rotate relative to the lower linking member while remaining connected to linking member.

Figure 5:
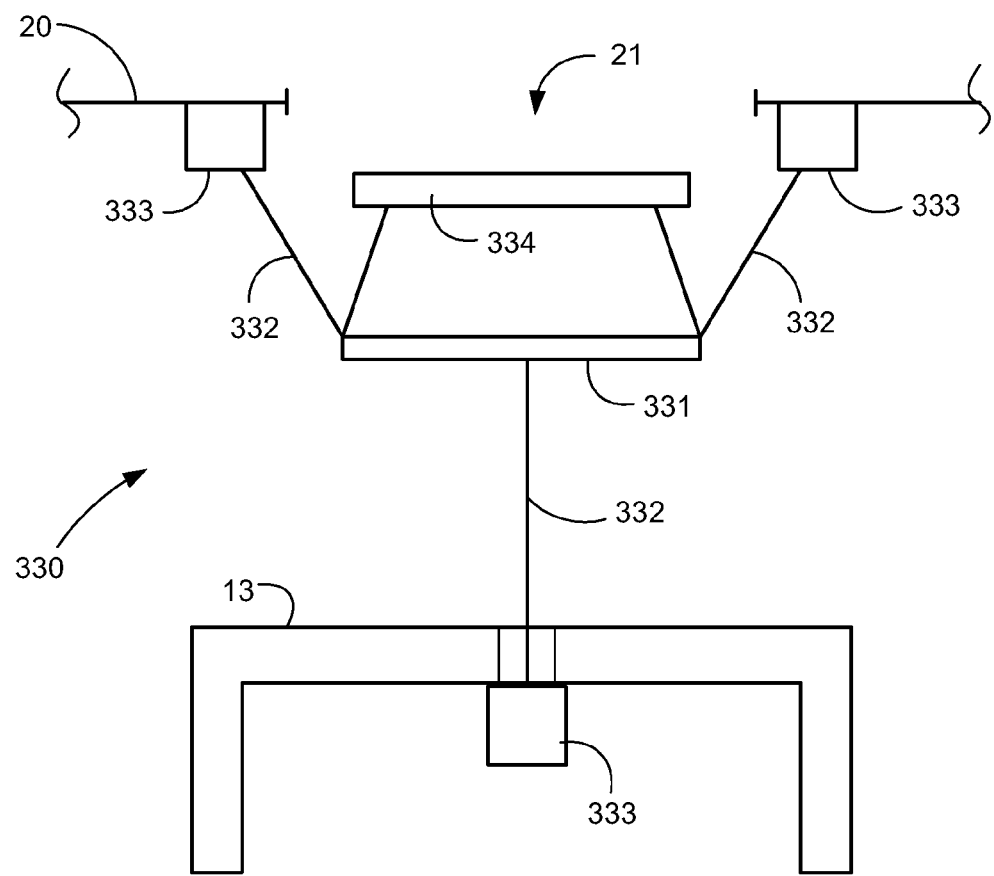
FIG. 5 is a front schematic view of yet another exemplary embodiment of an occupant restraint system for use in a vehicle.

FIG. 5 illustrates another exemplary embodiment of an occupant restraint system 330 configured for use in a vehicle to restrain an occupant (not shown) of the vehicle provided within the turret assembly 20 of the vehicle. The occupant restraint system 330 may be configured to connect to the turret assembly 20 to suspend the occupant restrained to the restraint system within the opening 21 of the turret at a predetermined position above the base 13 of the vehicle. The occupant restraint system 330 includes a seat support member (or seat member) 331 to provide a seating surface to the restrained occupant, an occupant harness assembly 334 for restraining the occupant to the restraint system, a plurality of winding mechanisms 333 to displace the seat member 331 as well as the harness assembly 334, and a plurality of linking members 332 connecting the seat member 331 to the winding mechanisms 333. As shown in FIG. 5, the occupant restraint system 230 may include three winding mechanisms 333 and three linking members 332, whereby each linking member 332 includes a first end connected to one of the three winding mechanisms 333 and a second end connected to the seat support member 331. Two of the winding mechanism 333 may be provided above the seat member 331, while the third winding mechanism 333 may be provided below the seat member 331. The harness assembly 334 may be connected to the seat member 331 through a flexible strap or webbing, which may allow for length adjustment.

The linking members 332 may be configured to remain in tension to suspend the seat member 331 in position until the occupant restraint system is activated. When the occupant restraint system is activated, the displacing mechanisms may wind or unwind the connected linking member, to displace the seat member 331 upwardly or downwardly (relative to the base 13 of the vehicle) to reduce or increase the exposure of the occupant above the opening of the turret. It should be noted that the winding mechanisms and/or displacing mechanisms disclosed herein may be configured to include a device, such as a pyrotechnic device, to provide almost instantaneous energy that induces enough force to displace (or move) the system as well as the occupant weighted down with full gear (e.g., helmet, flak jacket, etc.) the necessary distance (or length) over a very short period of time.

Figure 6:
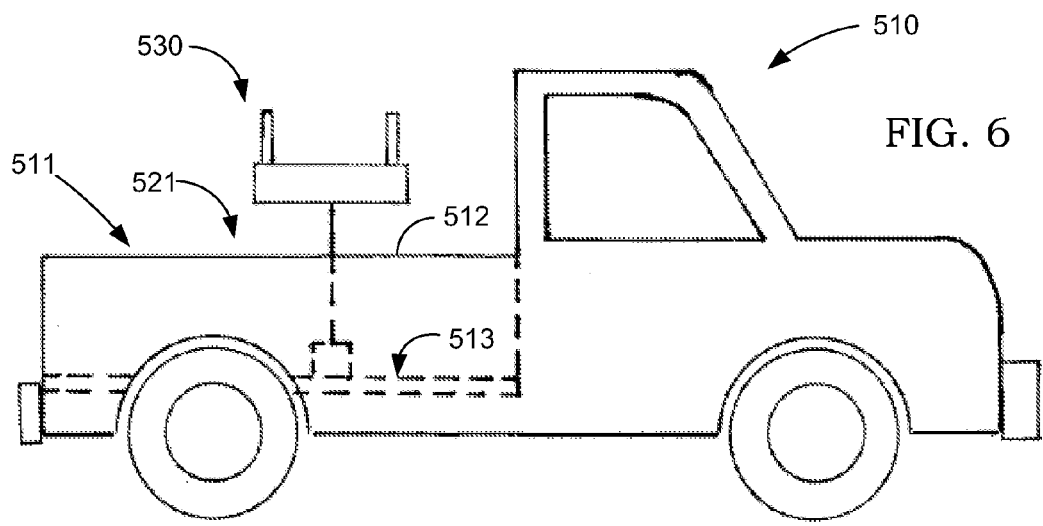
FIG. 6 is a side view of an exemplary embodiment of a vehicle having an occupant restraint system to restrain an occupant positioned in the box portion of the vehicle.

FIG. 6 illustrates another exemplary embodiment of a vehicle 510, which is configured to include a box portion 511 having walls 512 that extend from a base 513, and an occupant restraint system 530 configured to restrain an occupant (not shown) provided in the box portion 511. The box portion 511 includes an opening 521 formed by the walls 512 that is configured to allow access into and out (i.e., ingress and egress) of the box portion 511 of the vehicle 510 by an occupant. The box portion 511 may include a cover (not shown) to the opening to allow selective access to the vehicle. The box portion 511 may further include a firearm (not shown) or other instrument, the operation of which may necessitate the occupant provided in the box portion 511 to be at least partially exposed from the vehicle, such as beyond the walls 512 of the box portion 511 of the vehicle.

Figure 7:
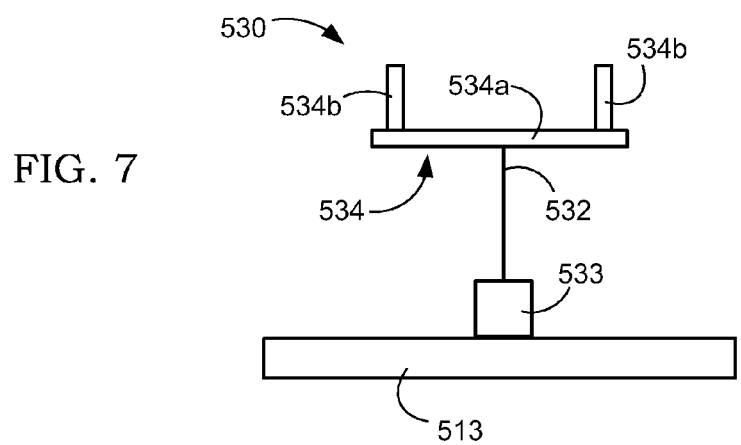
FIG. 7 is a rear schematic view of an exemplary embodiment of an occupant restraint system for use in a vehicle, such as the vehicle of FIG. 6.

FIG. 7 illustrates the occupant restraint system 530 according to an exemplary embodiment that is configured for use in the vehicle 510 to restrain an occupant (not shown) provided within the box portion 511 of the vehicle 510. The occupant restraint system 530 may be configured to connect to the base 513 of the vehicle to restrain the occupant to prevent the occupant from falling out of or being ejected from the box portion 511 of the vehicle 510. The occupant restraint system 530 includes an occupant harness assembly 534 for restraining the occupant to the restraint system, a winding mechanism 533 to displace the occupant harness assembly 534, and a linking member 532 connecting the occupant harness assembly 534 to the winding mechanisms 533.

Figure 8:
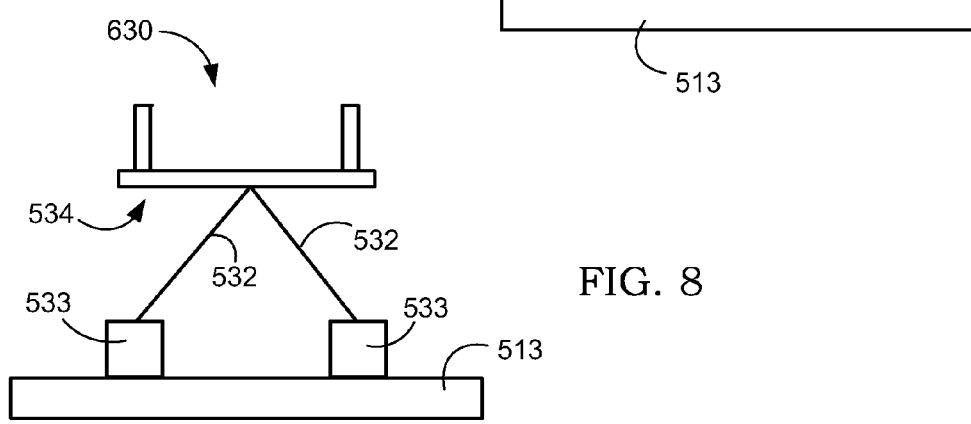
FIG. 8 is a rear schematic view of another exemplary embodiment of an occupant restraint system for use in a vehicle.

FIG. 8 illustrates another exemplary embodiment of an occupant restraint system 630 configured to restrain an occupant provided in an open portion (e.g., a box) of a vehicle. The occupant restraint system 630 may include an occupant harness assembly 534, a plurality of winding mechanisms 533, and a plurality of linking members 332, whereby each linking member 332 includes a first end connected to one of the winding mechanisms 333 and a second end connected to the occupant harness assembly 534.

The occupant harness assembly 534 may include a belt 534a configured to circumscribe the occupant, such as the chest or waist of the occupant, to attach the occupant restraint system to the occupant. The occupant harness assembly 534 may also include one or a plurality of straps 534b that may be configured to wrap around the occupant, such as the shoulders of the occupant, in order to provide additional restraint. The occupant harness assembly 534 may provide for detachable or non-detachable connection of the linking member 532. The winding mechanism 533 may be configured as disclosed herein, which may wind or unwind the linking member 332 upon activation. The linking member 532 may be configured as disclosed herein, which may connect the occupant harness assembly 534 to the winding mechanism 533.

The occupant restraint systems 530, 630 may be configured to restrain the occupant during normal operation of the vehicle, and upon occurrence of a triggering event, such as an event determined by the RCM of the vehicle, the occupant restraint system 530, 630 may be configured to displace the occupant toward the base 513 of the vehicle 510 to eliminate or reduce the amount of the occupant exposed from the vehicle through the opening 521 of the box portion 511, or to prevent ejection of the restrained occupant from the box portion 511 of the vehicle. Upon occurrence of a triggering event, the vehicle (e.g., RCM of the vehicle) and/or the occupant restraint system 530, 630 may activate the winding mechanism 533 to wind the linking member 532, thereby retracting at least a portion of the linking member 532 into the winding mechanism 533 to pull the occupant harness assembly 534 and the restrained occupant toward the winding mechanism 533 (and the base 513 of the vehicle 510). The winding mechanism 533 may displace the restrained occupant toward the winding mechanism 533 and into the vehicle a predetermined distance set by a travel stop member (not shown), whereby only a portion of the linking member 532 is retracted by the winding mechanism 533, or may displace the restrained occupant toward the winding mechanism 533 such that all or substantially all of the linking member 532 is retracted by the winding mechanism 533 thereby restraining the occupant proximate to the base 513 of the vehicle.

The occupant restraint systems as disclosed herein may provide for manual or automated adjustability of the occupant restraint system (e.g., harness assembly) and hence the restrained occupant. The adjustability of the occupant restraint system (e.g., harness assembly) may be controlled by the occupant restraint system, by the RCM of the vehicle, remotely inside (or outside) the vehicle, or any combination thereof, to provide improved protection to the restrained occupant by changing (e.g., reducing, eliminating) the exposure of the restrained occupant, such as during rollover events or during other events where exposure of the occupant outside the turret (or other opening) of the vehicle could likely harm the occupant. For example, if the vehicle were to be induced to rollover, such as from impacting an explosive device (e.g., landmine), the occupant restraint system could determine from data collected by sensors that the occupant is exposed and likely to be hurt, which may trigger activation of the occupant restraint system to withdraw or pull the occupant restrained to the occupant restraint system into the vehicle through the turret, thereby eliminating the exposure of the occupant and reducing the likelihood of harm to the occupant from the vehicle rollover.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the occupant restraint systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An occupant restraint system for securing an occupant of a vehicle, comprising:
    a harness coupled to the occupant by surrounding a portion of the occupant;
    a winding mechanism comprising a motorized retractor that is fixed to the vehicle and configured to operate in a first mode and a second mode; and
    a flexible linking member having a first end coupled to the harness and a second end coupled to the winding mechanism, the linking member being configured to selectively wind and unwind from the winding mechanism;

wherein when the winding mechanism is in the first mode of operation, the linking member may be unwound from the winding mechanism to allow the occupant to move freely about the vehicle;

wherein when the winding mechanism is in the second mode of operation, the winding mechanism winds the linking member to pull the harness and coupled occupant toward the winding mechanism.

2. The occupant restraint system of claim 1, wherein the harness is also coupled to the vehicle through a flexible second linking member.

3. The occupant restraint system of claim 2, wherein the second linking member is configured to selectively wind and unwind from a second winding mechanism comprising a motorized retractor and coupled to the vehicle at a location above the first winding mechanism.

4. The occupant restraint system of claim 2, wherein the second linking member includes an engaging member that is configured to selectively couple to a release mechanism comprising a buckle mechanism connected to the vehicle.

5. The occupant restraint system of claim 3, wherein the second linking member is configured to unwind from the second winding mechanism when the first linking member winds into the first winding mechanism, and the second linking member is configured to wind into the second winding mechanism when the first linking member unwinds from the first winding mechanism.

6. The occupant restraint system of claim 1, further comprising a connector disposed between the harness and the linking member, the connector being configured to provide selective coupling between the harness and the linking member.

7. The occupant restraint system of claim 2, further comprising a connector disposed between the harness and the second linking member, the connector being configured to provide selective coupling between the harness and the second linking member.

8. The occupant restraint system of claim 2, further comprising a travel stop configured to limit a displacement of the harness relative to the vehicle.

9. The occupant restraint system of claim 1, further comprising a sensor and a control module configured to determine the amount of the occupant that is exposed outside the vehicle, wherein the control module actuates the motorized retractor to move the harness by at least the amount.

10. An occupant restraint system for securing an occupant of a vehicle, comprising:
a seat support member configured to provide seating to the occupant;
a webbing having a first end and a second end connected to the seat support member;
a harness configured to secure the occupant and to couple to one of the webbing and seat support member;
a first winding mechanism comprising a motorized retractor that is fixed to the vehicle at a location below the seat supporting member and configured to operate in a first mode and a second mode;
a second winding mechanism comprising a motorized retractor that is fixed to the vehicle at a location above the seat supporting member and configured to operate in a first mode and a second mode, the first end of the webbing being configured to selectively wind and unwind from the second winding mechanism; and
a flexible linking member having a first end coupled to the harness and a second end coupled to the first winding mechanism, the linking member being configured to selectively wind and unwind from the first winding mechanism;

wherein when the first winding mechanism is in the first mode of operation, the linking member may be unwound from the first winding mechanism to allow the occupant to move freely in the vehicle;

wherein when the first winding mechanism is in the second mode of operation, the first winding mechanism winds the linking member to pull the harness and occupant toward the first winding mechanism;

wherein when the second winding mechanism is in the first mode of operation, the webbing may be unwound from the second winding mechanism to allow the occupant to move freely in the vehicle;

wherein when the second winding mechanism is in the second mode of operation, the second winding mechanism winds the webbing to pull the harness and occupant toward the second winding mechanism.

11. The occupant restraint system of claim 10, further comprising a second webbing having a first end and a second end connected to the seat support member, wherein the first end is configured to selectively wind and unwind from a third winding mechanism comprising a motorized retractor that is coupled to the vehicle at a location above the seat supporting member.

12. The occupant restraint system of claim 11, further comprising a connector disposed between the harness and the one of the webbing and the seat support member, the connector being configured to provide selective coupling between the harness and the one of the webbing and the seat support member.

13. The occupant restraint system of claim 11, further comprising a travel stop configured to limit a displacement of the harness relative to the vehicle.

14. The occupant restraint system of claim 11, wherein the first winding mechanism is provided below the harness and the second winding mechanism is provided above the harness.

15. The occupant restraint system of claim 10, wherein the webbing is configured to unwind from the second winding mechanism when the linking member winds into the first winding mechanism, and the webbing is configured to wind into the second winding mechanism when the linking member unwinds from the first winding mechanism.

16. The occupant restraint system of claim 10, further comprising a connector disposed between the harness and the linking member, the connector being configured to provide selective coupling between the harness and the linking member.

17. A vehicle comprising:
a sensor configured to detect a parameter of the vehicle;
a control module configured to communicate with the sensor; and
an occupant restraint assembly for securing an occupant of the vehicle, the occupant restraint assembly including:
a harness configured to be coupled to the occupant;
a winding mechanism fixed to the vehicle and configured to operate in a first mode and a second mode; and
a flexible linking member having a first end coupled to the harness and a second end coupled to the winding mechanism, the linking member being configured to selectively wind and unwind from the winding mechanism;

wherein when the winding mechanism is in the first mode of operation, the linking member may be unwound from the winding mechanism to allow the occupant to move freely in the vehicle;

wherein when the winding mechanism is in the second mode of operation, the winding mechanism winds the linking member to pull the harness and occupant toward the winding mechanism;

wherein the control module controls the operation of the winding mechanism based on a data received from the sensor regarding the parameter.

18. The vehicle of claim 17, wherein the sensor is one of a proximity sensor, an acceleration sensor, and an occupant detection sensor.

19. The vehicle of claim 17, wherein the control module determines an amount of the occupant that is exposed outside the vehicle and actuates the winding mechanism to move the harness by at least the amount.

20. The vehicle of claim 17, wherein the control module is configured to communicate external to the vehicle to receive a second data for use in predicting an event triggering activation of the winding mechanism.

\* \* \* \* \*